US010690214B2

(12) United States Patent
Turner

(10) Patent No.: US 10,690,214 B2
(45) Date of Patent: Jun. 23, 2020

(54) SHIELD FOR VEHICLE SHOCK ABSORBER

(71) Applicant: Daystar Products International, Inc., Phoenix, AZ (US)

(72) Inventor: Mark Alan Turner, Phoenix, AZ (US)

(73) Assignee: Daystar Products International, Inc., Phoenix, AZ (US)

(*) Notice: Subject to any disclaimer, the term of this patent is extended or adjusted under 35 U.S.C. 154(b) by 24 days.

(21) Appl. No.: 16/103,769

(22) Filed: Aug. 14, 2018

(65) Prior Publication Data

US 2020/0056675 A1    Feb. 20, 2020

(51) Int. Cl.
*F16F 9/38* (2006.01)

(52) U.S. Cl.
CPC ...................... *F16F 9/38* (2013.01)

(58) Field of Classification Search
CPC .. F16F 9/38; F16F 9/3235; F16F 9/084; F16F 9/05; F16F 2230/0023; F16F 2230/10; E05C 17/30; B60G 17/0485; B60G 2202/314; B60G 2204/1262; B60G 15/12; B60G 15/08
See application file for complete search history.

(56) References Cited

U.S. PATENT DOCUMENTS

| | | | | |
|---|---|---|---|---|
| 4,372,429 A * | 2/1983 | Marx | ......................... | F16F 9/38 188/322.12 |
| 4,449,702 A * | 5/1984 | Hasegawa | ............... | E05C 17/30 188/300 |
| 4,778,198 A * | 10/1988 | Gold | ..................... | B60G 13/001 267/64.24 |
| 4,813,100 A * | 3/1989 | King | ....................... | E05C 17/30 16/49 |
| 8,403,116 B2 * | 3/2013 | Handke | ..................... | F16F 9/38 188/322.19 |
| 2015/0192185 A1* | 7/2015 | Hansen | ..................... | F16F 9/38 188/322.12 |
| 2015/0204409 A1* | 7/2015 | Takeo | ...................... | F16F 9/38 188/322.19 |

FOREIGN PATENT DOCUMENTS

| | | | | |
|---|---|---|---|---|
| DE | 3537520 C1 * | 4/1987 | ................ | F16F 9/38 |
| DE | 102013101558 A1 * | 8/2014 | ................ | F16F 9/38 |

* cited by examiner

*Primary Examiner* — Bradley T King
*Assistant Examiner* — Stephen M Bowes
(74) *Attorney, Agent, or Firm* — Lowe Graham Jones PLLC

(57) ABSTRACT

A shield is slidably mounted to a cylinder of a shock absorber and fastened to a piston shaft of the shock absorber. The shield may include a circumferential slot that fits over a disk formed on the piston shaft to secure the shield to the piston shaft. The shield may include a partial cylinder that extends over a point of entry of the piston shaft into the cylinder. For example, the shield may have a cross section that is a 200 to 270 degree arc. The shield may include a guide along an interior surface that engages a slider secured to the cylinder. The guide may be a slot and the slider is a post seated in the slot.

15 Claims, 2 Drawing Sheets

SHIELD FOR VEHICLE SHOCK ABSORBER

FIELD OF THE INVENTION

This invention relates to shock absorbers for a vehicle suspension.

BACKGROUND OF THE INVENTION

Shock absorbers are an integral part of a vehicle suspension. A typical shock absorber includes a cylinder and a piston that is slidable within the cylinder. A good seal between the cylinder and the piston is important to keep out contaminants and to ensure proper compression of gasses or fluid contained in the cylinder.

However, off road vehicles that use shock absorbers are often exposed to mud, sand, dirt, and water which can increase the wear on the shock absorbers and shorten their useful life or cause failure.

What is needed is an improved implementation of a shock absorber that can handle off road applications.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
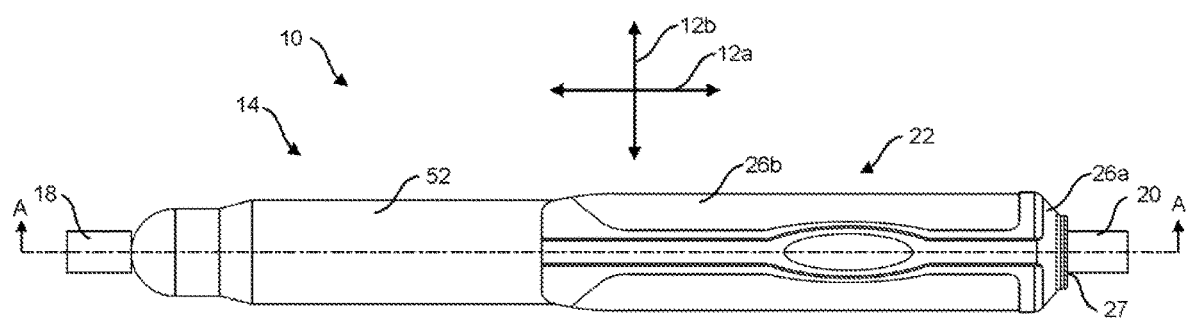
FIG. 1 is a top view of a shock absorber with a shield in accordance with an embodiment of the present invention.
Figure 2:
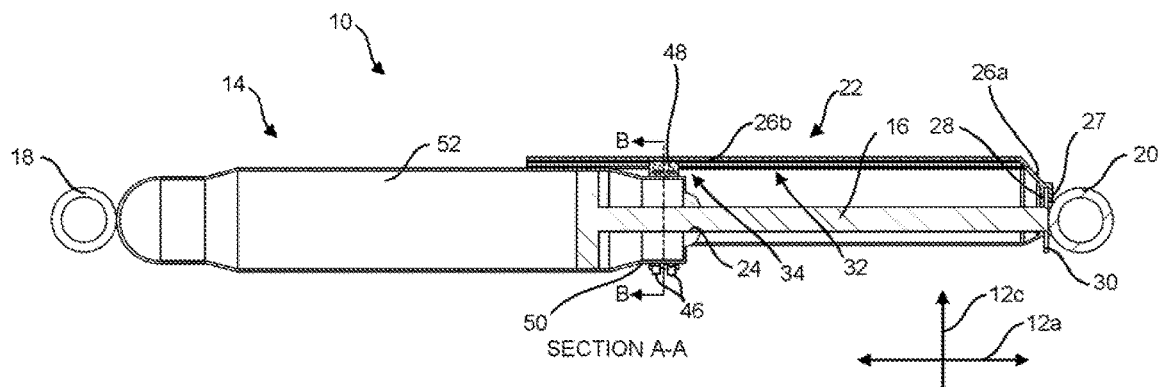
FIG. 2 is a side cross-sectional view of the shock absorber and shield of FIG. 1.
Figure 4:
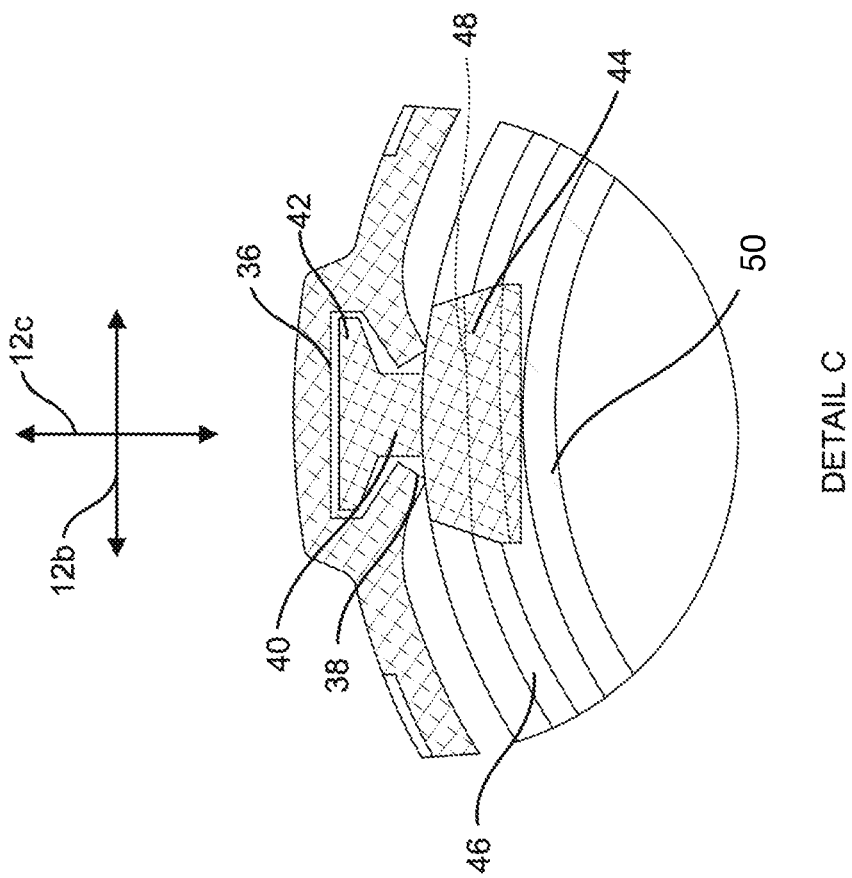
FIG. 4 is a detailed view of a cross section of a guide and slider in accordance with an embodiment of the present invention.

Referring to FIGS. 1 and 2, an apparatus 10 may be understood with respect to a longitudinal direction 12a, a horizontal direction 12b, and a vertical direction 12c that are mutually perpendicular to one another and which are used herein to define the relative orientation of components of the apparatus 10 but do not necessarily correspond to globally defined longitudinal, horizontal, and vertical directions when in use.

The apparatus 10 may include a shock absorber including a cylinder 14 and a piston shaft 16. An end mount 18 secures to the cylinder 14 and an end mount 20 secures to the piston shaft 16. The end mounts 18, 20 may mount to a vehicle frame and suspension arm of a vehicle as known in the art in any configuration known in the art.

As known in the art, forces applied to the end mounts 18, 20 result in movement of the piston shaft 16 relative to the cylinder 14. Gas or fluid within the cylinder 14 resists this movement of a piston positioned within the cylinder 14 and coupled to the piston shaft 16 thereby providing shock absorption.

In the illustrated embodiment, a shield 22 is mounted to one of the piston shaft 16 and cylinder 14 and is slidable relative to the other of the cylinder 14 and the piston shaft 16. In the description below, the shield 22 is described as being fixed relative to the piston shaft 16 and slidable relative to the cylinder 14. However, the reverse is also a feasible implementation.

As is apparent, the shield 22 has a substantially cylindrical shape with an axis substantially parallel to the longitudinal direction 12a. For purposes of this disclosure, "substantially cylindrical shape" shall be understood to mean an inner surface of the shield conforms substantially along at least 80 percent of its extent to a cylinder. For purposes of this disclosure, "conforms substantially" shall be understood to mean that it is possible to define a cylinder with a diameter D such that at least 80 percent of the inner surface of the shield is within 0.05*D from the cylinder. As is also apparent, the shield has a length along the longitudinal direction 12a that is many times greater than the diameter D of the cylinder to which it substantially conforms. For example, the length of the shield may be between 3 and 6 times the diameter D, such as between 3.5 and 4.5 times D.

The direction of movement of the piston shaft 16 within the cylinder 14 is also substantially parallel to the longitudinal direction 12a. For purposes of this application "substantially parallel" shall be understood to be within 5 degrees of parallel.

As shown in FIG. 2, when the piston shaft 16 is at its most extended position, the shield 22 still overlaps the cylinder 14. In particular, the shield 22 may advantageously overlap an outer face of an opening 24 through which the piston shaft 16 exits the cylinder 14 by a minimum amount, such as between 1 and 6 inches. In this manner, the shield 22 can protect the opening 24 from contamination throughout the range of movement of the piston shaft 16 relative to the cylinder 14. When the piston shaft 16 is at its most compressed position within the cylinder 14, the shield 22 may advantageously not extend to the end mount 20 such that the shield 22 does not interfere with a structure (suspension arm, vehicle frame, etc.) to which the cylinder 14 is mounted.

The shield 22 may secure to the piston shaft 16 by various means. In the illustrated embodiment, the shield 22 includes a cap portion 26a at an end thereof closest to the end mount 20. The cap portion 26a extends partially inwardly from the substantially cylindrical portion 26b of the shield and defines an opening 27 through which the piston shaft 16 passes.

As shown in FIG. 2, the cap portion 26a defines a circumferential slot 28. The piston shaft 16 includes a disk 30 having a circular shape about an axis parallel to the longitudinal direction 12a. The shield 22 may secure to the piston shaft 16 by positioning the disk 30 within the slot 28.

Figure 3:
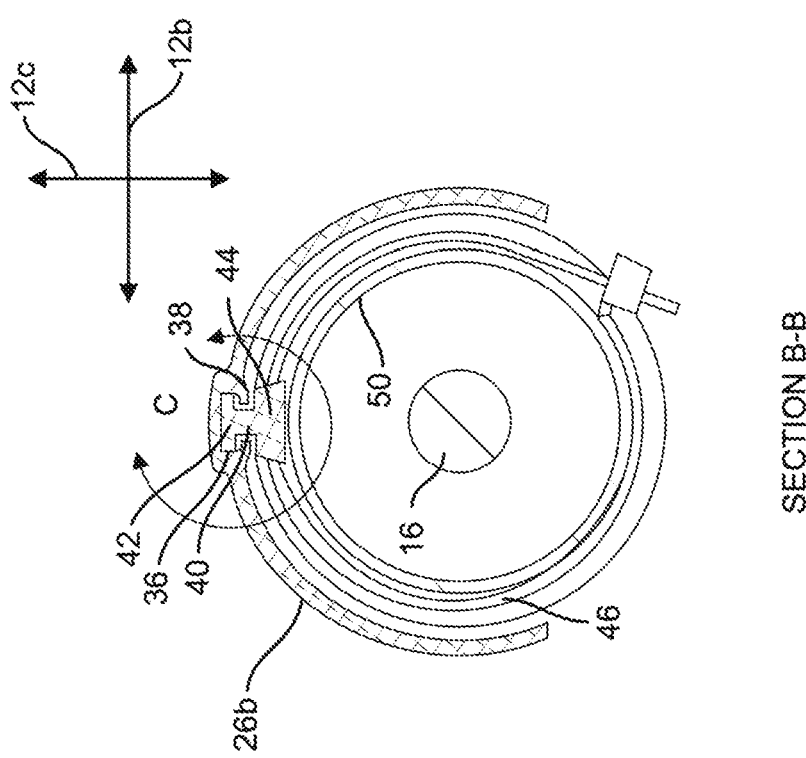
FIG. 3 is a front cross sectional view of the shock absorber and shield of FIG. 1.

For example, as shown in FIG. 3, the substantially cylindrical portion 26b may be a shell having a wall thickness and that has a cross section that is arc-shaped rather than being a complete circle. For example, the substantially cylindrical portion 26b of the shield 22 may define a partial cylindrical shape with an arc length of between 200 and 270 degrees. The cap portion 26 and opening 27 may likewise occupy only an angular region about the axis of the substantially cylindrical portion 26b between 200 and 270 degrees. For example, the angular region may be the same as, and coextensive with, the arc length defined by the substantially cylindrical portion 26b.

Accordingly, to secure the shield 22 to the piston shaft 16, the cap portion 26a and substantially cylindrical portion 26b around the circumferential slot 28 may be deformed sufficiently to enable the disk 30 to be inserted into the circumferential slot 28. Likewise, the substantially cylindrical portion 26b may be deformed to pass around the body 52 of the cylinder 14. The rigidity of the cap portion 26a and substantially cylindrical portion 26b will thereafter retain the disk 30 within the slot 28. For example, the shield 22 may be made of a substantially rigid polymer. For example, in order to provide sufficient rigidity and impact resistance the shield 22 may be made of a high density polyethylene resin, nylon or other resin based plastic having the following properties: specific gravity in the range of 0.962 (per ASTM D792 method), durometer hardness of 55 (per ASTM D2240 method), tensile strength of at least 4200 psi (yield) & 2700 psi (break), tensile elongation of at least 7% (yield) and at least 1200% (break) (per ASTM D638), tensile impact strength of at least 50.0 ft-lb./in$^2$ (per ASTM D1822) and a flexural modulus of 168,000 psi (per ASTM D790B).

Likewise the wall thickness of the cap portion 26a, substantially cylindrical portion 26b, and material defining the slot 28 may be sufficient to provide rigidity while still permitting sufficient deformation to permit insertion.

In some embodiments, the shield 22 may also slidably secure to the cylinder 14. For example, a slider 32 secures to an inner surface of the substantially cylindrical portion 26b and a guide 34 may mount to the cylinder 14. The slider 32 extends parallel to the longitudinal direction 12a and resists movement perpendicular to the longitudinal direction 12a while permitting sliding parallel to the direction 12a subject only to frictional forces between the slider 32 and the guide 34.

As shown in FIG. 3, slider 32 may be embodied as a slot 36 and an opening 38 connected to the slot, the opening 38 being narrower than the width of the slot 36 at its widest point and extending along the slot. The slot 36 and opening 38 may extend parallel to the longitudinal direction 12a along the inner surface of the substantially cylindrical portion 26b. For example, along at least 80 percent of the length of the substantially cylindrical portion 26b parallel to the longitudinal direction 12a. The guide 34 may be embodied as a post 40 sized to fit within the opening 38 and a widened head 42 secured to the post such that the head 42 is wider than the opening 38 and positioned in the slot 36 when the post 40 is positioned within the opening 38. In this manner, sliding of the head 42 within the slot 36 and sliding of the post 40 within the opening 38 is permitted along the longitudinal direction 12a subject only to friction. However, movement perpendicular to the longitudinal direction 12a is permitted only to the extent that the post 40 and head 42 are smaller than the opening 38 and slot 36, respectively.

In other embodiments, the slider 32 is embodied as a rail, such as a rail having a cross section similar to the post 40 and head 42, and the guide 34 is embodied as a member having a slot sized to slidably receive the rail.

In the illustrated embodiment, the post 40 secures to a base 44 that rests on the cylinder 14 and is secured to the cylinder 14 by a fastening means, such as screws, adhesive, welding, or the like. In the illustrated embodiment, the base 44 is secured to the cylinder 14 by one or more bands 46 encircling the cylinder 14 and passing through openings 48 in the base 44. For example, the bands 46 may be embodied as one or more zip-ties or other type of bands.

In the illustrated embodiment, the cylinder 14 includes a smaller-diameter portion 50 at the end having the opening 24 (see FIG. 2). For example, the smaller-diameter portion 50 may have a diameter that is between 75 and 80 percent of the diameter of a body 52 of the cylinder 14 that constitutes a major portion of the extent of the cylinder 14 along the longitudinal direction 12a. Accordingly, the slot 36, opening 38, post 40, head 42, and base 44 when assembled may be sized to occupy the gap between the substantially cylindrical portion 26b and the smaller-diameter portion 50 such that the outer face of the opening 38 rests on the body 52 during operation or is offset by a small gap, e.g. 1-3 mm.

The invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
    a shell having an inner surface having a shape defining a cylinder having a diameter (D) and an axis, the shell having a length that is at least three times larger than the diameter (D);
    a cap secured at one end of the shell and defining an aperture for receiving a piston shaft of a shock absorber;
    a guide extending along the inner surface parallel to the axis, the guide being a slot; and
    a slider sized to slidably insert within the slot and permit sliding relative to the slot along the axis;
    wherein the shell and cap are formed of an impact resistant material including at least one of resin and plastic; and
    wherein:
        the guide comprises an opening extending along the slot, the opening being smaller than the slot; and
        the slider comprises a post having a head secured thereto, the head being wider than the post, the post being sized to slidably insert within the opening and the head being sized to slidably insert within the slot.

2. The apparatus of claim 1, wherein the slider comprises a base, the post being secured to the base, the base defining a structure for securing to a cylinder of the shock absorber.

3. The apparatus of claim 2, wherein the structure comprises an opening sized to receive a band encircling the cylinder.

4. The apparatus of claim 1, further comprising a fastening structure secured to the cap and configured to secure the cap to the piston shaft.

5. The apparatus of claim 4, wherein the fastening structure comprises a circumferential slot surrounding an opening and sized to receive a disk secured to the piston shaft.

6. The apparatus of claim 1, wherein the shell, cap, and guide are co-molded from a rigid yet impact resistant material including at least one of polyurethane, high density polyethylene resin, and nylon.

7. An apparatus comprising:
    a first cylinder;
    a piston shaft slidably secured to the first cylinder and extending outwardly from the first cylinder;
    a slider secured to the first cylinder;
    a shield comprising:
        a shell having an inner surface having a shape defining a second cylinder having a diameter (D) and an axis, the shell having a length that is at least three times larger than the diameter (D), the diameter (D) sized such that the shell fits around the first cylinder;
        a cap secured at one end of the shell and defining an aperture for receiving the piston shaft of a shock absorber; and
        a guide extending along the inner surface parallel to the axis, the slider being slidably engaged with the guide, the guide being a slot, the slider being sized to insert within the slot;
    wherein the shell and cap are formed of an impact resistant material including at least one of resin and plastic; and wherein:
the guide comprises a first opening extending along the slot, the first opening being smaller than the slot; and
the slider comprises a post having a head secured thereto, the head being wider than the post, the post being sized to slidably insert within the first opening and the head being sized to slidably insert within the slot.

8. The apparatus of claim 7, wherein the slider comprises a base, the post being secured to the base, the base defining a structure for securing to the first cylinder.

9. The apparatus of claim 8, wherein the structure comprises a second opening in the base, the apparatus further comprising a band encircling the first cylinder and passing through the second opening.

10. The apparatus of claim 9, wherein the band is a zip tie.

11. The apparatus of claim 7, further comprising a fastening structure secured to the cap and configured to secure the cap to the piston shaft.

12. The apparatus of claim 11, wherein the fastening structure comprises a circumferential slot surrounding the first opening and sized to receive a disk secured to the piston shaft.

13. The apparatus of claim 7, wherein the shell, cap, and guide are co-molded from a rigid yet impact resistant material including at least one of polyurethane, high density polyethylene resin, and nylon.

14. An apparatus comprising:
a shell having an inner surface having a shape defining a cylinder having a diameter (D) and an axis, the shell having a length that is at least three times larger than the diameter (D);
a cap secured at one end of the shell and defining an aperture for receiving a piston shaft of a shock absorber;
a guide extending along the inner surface parallel to the axis; and
a fastening structure secured to the cap and configured to secure the cap to the piston shaft;
wherein the shell and cap are formed of an impact resistant material including at least one of resin and plastic;
wherein the fastening structure comprises a circumferential slot surrounding an opening and sized to receive a disk secured to the piston shaft; and
wherein the shell, cap, opening, and circumferential slot occupy only an angular region defined with respect to the axis, the angular region being between 200 and 270 degrees.

15. An apparatus comprising:
a first cylinder;
a piston shaft slidably secured to the first cylinder and extending outwardly from the first cylinder;
a slider secured to the first cylinder;
a shield comprising:
a shell having an inner surface having a shape defining a second cylinder having a diameter (D) and an axis, the shell having a length that is at least three times larger than the diameter (D), the diameter (D) sized such that the shell fits around the first cylinder;
a cap secured at one end of the shell and defining an aperture for receiving a piston shaft of a shock absorber;
a guide extending along the inner surface parallel to the axis, the slider being slidably engaged with the guide; and
a fastening structure secured to the cap and configured to secure the cap to the piston shaft;
wherein the shell and cap are formed of an impact resistant material including at least one of resin and plastic;
wherein the fastening structure comprises a circumferential slot surrounding an opening and sized to receive a disk secured to the piston shaft; and
wherein the shell, cap, opening, and circumferential slot occupy only an angular region defined with respect to the axis, the angular region being between 200 and 270 degrees.

* * * * *